3,260,627
STABILIZED LIQUID OZONE COMPOSITION CONTAINING A BORON TRIFLUORIDE COMPLEX
James S. Logan, Niagara Falls, and Arthur Roaldi, Lancaster, N.Y., assignors to Olin Mathieson Chemical Corporation, a corporation of Virginia
No Drawing. Filed Jan. 30, 1958, Ser. No. 712,273
3 Claims. (Cl. 149—1)

This invention relates to liquid ozone which is stable under conditions of rapid evaporation.

Ozone, $O_3$, molecular weight 48, is an unstable blue gas with a pungent characteristic odor and is generally encountered in dilute form in admixture with air or oxygen. It has a melting point of $-191.1°$ C. and a boiling point of $-111.9°$ C. At $-111.9°$ C. ozone condenses to a dark blue liquid. Ozone is customarily handled as a gas or in admixture with liquid oxygen. It is used commercially in the purification of drinking water, as a powerful oxidant in both organic and inorganic reactions and in the treatment of industrial wastes. It is also used for the deodorization of air and sewage gases as well as for the preservation of foods in cold storage. More recently, liquefied ozone has found utility as an oxidant with rocket fuels. (See U.S. Patent 2,704,274 for a discussion in some detail of this use.) The handling of liquid ozone during its preparation, storage, shipment and use has presented new problems since it is easily exploded as are concentrated ozone-oxygen mixtures (above about 15 weight percent ozone), in either the liquid or vapor state. These explosions may be initiated by minute amounts of catalysts or organic matter, shock, electric spark or sudden changes in temperature, pressure, etc. For example, any hot spots in lines, valves, etc., in a liquid ozone handling system or any leaks in such a system could cause rapid evaporation of the liquid ozone resulting in an explosion.

It has now been found that liquid ozone can be rendered stable with respect to initiation of an explosion under rapid evaporation conditions by incorporating therein an additive selected from the class consisting of boron trifluoride and the complex of boron trifluoride with 100% phosphoric acid ($H_3PO_4$). The amount of the additive added to the ozone can vary widely but generally is from about 0.5 to 25 weight percent based on the ozone and preferably 15 to 25 weight percent.

In order to evaluate the stability of the liquid ozone compositions of this invention a test procedure was devised which is as follows: A standard vacuum line is used to condense, concentrate and supply ozone for the test. A 10 mm. Pyrex tube, about 6 inches long and sealed off at the bottom, is attached to the line after evacuation and ozone is vaporized from a storage trap and condensed into the test tube which is cooled in a liquid oxygen bath. The ozone is purified by evacuation to remove any oxygen resulting from decomposition during transfer. After adding nitrogen gas to the tube up to atmospheric pressure, it is manually removed from the oxygen bath and quickly placed in a water bath. The temperature of the latter determines the rate of boiling and is the criterion which determines effectiveness. Three types of results, upon immersion of the tube into the water bath, have been observed: an explosion, with shattering of the tube, a vigorous boiling of the ozone followed by a vapor phase explosion which does not shatter the tube, or a rapid boiling with no attendant explosion. This test procedure was employed in the following examples:

*Example I*

3 grams of ozone were condensed into the tube maintained at $-183°$ C. by the liquid oxygen bath. The liquid ozone was purified by evacuation of the tube to remove any oxygen and the tube was pressured to atmospheric pressure with nitrogen. The tube was manually removed from the liquid oxygen bath and quickly placed in an ice-slush bath (0° C.). The tube exploded violently.

*Example II*

0.06 gram of boron trifluoride was placed in the tube and the tube was cooled to $-183°$ C. by immersion in a liquid oxygen bath. Ozone, 0.3 gram, was then condensed on top of the $BF_3$. After the tube was brought to atmospheric pressure by the addition of nitrogen gas, it was manually removed from the oxygen bath and quickly placed in a beaker of water maintained at 25° C. Upon immersion of the tube in the water, a rapid boiling of the ozone occurred with no explosion. It is apparent from this example that boron trifluoride is effective in preventing an explosion when ozone is vigorously boiled.

The procedure of Example II was repeated using about 0.06 gram of boron trifluoride and the complex of $BF_3$ with 100% $H_3PO_4$ as the additive, 0.3 gram of ozone, and water baths maintained at 25° C., 50° C. and 75° C. The results are set forth in the following Table I in which a dash (—) indicates no explosion, a plus sign (+) indicates an explosion with shattering of the tube, and (+p) indicates a vigorous boiling followed by a vapor phase explosion which does not shatter the tube.

TABLE I

| Additive | Water Bath Temperature | | |
|---|---|---|---|
| | 25° | 50° | 75° |
| $BF_3$ | — | +p | |
| $BF_3$—100% $H_3PO_4$ Complex | | — | + |

We claim:
1. A liquid ozone composition consisting essentially of liquid ozone having incorporated therein a material selected from the group consisting of boron trifluoride and the complex of boron trifluoride with 100% phosphoric acid ($H_3PO_4$) in an amount effective to stabilize the liquid ozone with respect to initiation of an explosion under rapid evaporation conditions.

2. A liquid ozone composition consisting essentially of liquid ozone and about 0.5 to 25 weight percent based on the ozone of a material selected from the group consisting of boron trifluoride and the complex of boron trifluoride with 100% phosphoric acid ($H_3PO_4$).

3. A liquid ozone composition consisting essentially of liquid ozone and about 15 to 25 weight percent based on the ozone of a material selected from the group consisting of boron trifluoride and the complex of boron trifluoride with 100% phosphoric acid ($H_3PO_4$).

References Cited by the Examiner
UNITED STATES PATENTS

| 135,226 | 1/1873 | Johnson | 23—222 |
| 2,700,648 | 1/1955 | Thorp et al. | 23—222 |
| 2,704,274 | 3/1955 | Allison | 204—176 |

OTHER REFERENCES

Booth, "Boron Trifluoride and Derivatives," page 57 (1949).

Cook, "Ind. and Eng. Chem.," vol. 48, No. 4, pp. 736–741, April 1956.

Thorp, "Bibliography of Ozone Technology," vol. 2, pp. 30–47 (1955).

LEON D. ROSDOL, *Primary Examiner.*

ROGER L. CAMPBELL, *Examiner.*

C. D. QUARFORTH, B. R. PADGETT,
*Assistant Examiners.*